(12) United States Patent
Nayak et al.

(10) Patent No.: US 11,416,054 B2
(45) Date of Patent: Aug. 16, 2022

(54) USB TYPE-C SIGNAL INTERFACE CIRCUIT

(71) Applicant: Cypress Semiconductor Corporation, San Jose, CA (US)

(72) Inventors: Anup Nayak, Fremont, CA (US); Karri Rajesh, Visakhapatnam (IN); Hemant P. Vispute, Bangalore (IN); Arun Khamesra, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 22 days.

(21) Appl. No.: 17/060,328

(22) Filed: Oct. 1, 2020

(65) Prior Publication Data

US 2021/0089100 A1 Mar. 25, 2021

Related U.S. Application Data

(63) Continuation of application No. 16/381,956, filed on Apr. 11, 2019, now Pat. No. 10,809,787, which is a continuation of application No. 16/000,730, filed on Jun. 5, 2018, now Pat. No. 10,338,656.

(60) Provisional application No. 62/656,274, filed on Apr. 11, 2018.

(51) Int. Cl.
*G06F 1/26* (2006.01)
*G06F 13/38* (2006.01)
*H01R 107/00* (2006.01)
*H01R 24/62* (2011.01)

(52) U.S. Cl.
CPC ............ *G06F 1/266* (2013.01); *G06F 13/385* (2013.01); *H01R 24/62* (2013.01); *H01R 2107/00* (2013.01)

(58) Field of Classification Search
CPC ....... G06F 1/266; G06F 13/385; H01R 24/62; H01R 2107/00
See application file for complete search history.

(56) References Cited

U.S. PATENT DOCUMENTS 9,400,546 B1 * 7/2016 Agarwal ................. G06F 1/266
9,652,351 B2   5/2017 Srivastava et al.
9,934,176 B2   4/2018 Wang et al.
(Continued)

FOREIGN PATENT DOCUMENTS

CN   101364731 B   10/2010
CN   105893305 A   8/2016
WO   2017065769 A1   4/2017

OTHER PUBLICATIONS

"MAX14748 USB Type-C Charger", Maxim Integrated, 2018, 71 pages.
(Continued)

*Primary Examiner* — Nimesh G Patel

(57) ABSTRACT

A device includes a USB-C controller instantiated as a first integrated circuit that includes a first set of host terminals coupled to host controllers and a second set of terminals coupled to sets of D+/D− terminals of a type-C receptacle. A D+/D− multiplexer is to selectively couple the first set of host terminals to the second set of terminals. An electrostatic discharge (ESD) protection circuit is coupled between the D+/D− multiplexer and the second set of terminals. A charger detector circuit is coupled between a positive data system terminal and a negative data system terminal of the first set of terminals, the charger detector circuit to detect whether the second set of terminals is coupled to a USB charger through the type-C receptacle.

18 Claims, 12 Drawing Sheets

(56) References Cited

U.S. PATENT DOCUMENTS

| | | | |
|---|---|---|---|
| 10,261,557 B2* | 4/2019 | Kim | G06F 1/10 |
| 10,338,656 B1 | 7/2019 | Nayak et al. | |
| 2016/0110305 A1* | 4/2016 | Hundal | G06F 13/387 |
| | | | 710/316 |
| 2016/0179648 A1 | 6/2016 | Srivastava et al. | |
| 2016/0190794 A1 | 6/2016 | Forghani-zadeh et al. | |
| 2017/0017595 A1* | 1/2017 | Schnell | G06F 13/4022 |
| 2017/0047749 A1 | 2/2017 | Cornelius et al. | |
| 2017/0127203 A1* | 5/2017 | Ryu | H04R 5/04 |
| 2017/0192923 A1 | 7/2017 | Liu | |
| 2017/0192924 A1 | 7/2017 | Chiba | |
| 2017/0277251 A1 | 9/2017 | Gong et al. | |
| 2017/0277650 A1 | 9/2017 | Zhao et al. | |
| 2017/0286360 A1* | 10/2017 | Srivastava | G06F 13/385 |
| 2017/0344098 A1* | 11/2017 | Abu Hilal | G06F 13/4282 |
| 2017/0344508 A1 | 11/2017 | Setiawan et al. | |
| 2018/0032460 A1 | 2/2018 | Chuang et al. | |
| 2018/0062386 A1 | 3/2018 | Mallikarjunaswamy et al. | |
| 2018/0095511 A1 | 4/2018 | Agarwal et al. | |
| 2019/0065422 A1* | 2/2019 | Sporck | G06F 13/385 |

OTHER PUBLICATIONS

International Search Report for International Application No. PCT/US2019/025949 dated May 10, 2019, 2 pages.
USPTO Non-Final Rejection for U.S. Appl. No. 16/000,730 dated Oct. 19, 2018, 10 pages.
USPTO Non-Final Rejection for U.S. Appl. No. 16/381,956 dated Mar. 11, 2020, 5 pages.
USPTO Notice of Allowance for U.S. Appl. No. 16/000,730 dated Feb. 5, 2019, 5 pages.
USPTO Notice of Allowance for U.S. Appl. No. 16/381,956 dated Jun. 17, 2020, 5 pages.
Written Opinion of the International Searching Authority for International Application No. PCT/US2019/025949 dated May 10, 2019, 6 pages.

* cited by examiner

USB TYPE-C SIGNAL INTERFACE CIRCUIT

RELATED APPLICATIONS

This application is a Continuation Application of U.S. patent application Ser. No. 16/381,956, filed Apr. 11, 2019, which is a Continuation Application of U.S. patent application Ser. No. 16/000,730, filed on Jun. 5, 2018, now U.S. Pat. No. 10,338,656, issued on Jul. 2, 2019, which claims the benefit of priority to U.S. Provisional Application No. 62/656,274, filed on Apr. 11, 2018, all of which are herein incorporated by reference in their entirety.

TECHNICAL FIELD

The disclosure relates to the field of electronic circuits, in particular to a USB type-C signal interface circuit.

BACKGROUND

Electronic circuits may include individual electronic components, such as resistors, transistors, capacitors, inductors, and diodes, among others, connected by conductive wires or traces through which electric current can flow. Electronic circuits may be constructed using discrete components, or more commonly integrated in an integrated circuit where the components and interconnections are formed on a common substrate, such as silicon.

BRIEF DESCRIPTION OF THE DRAWINGS

The disclosure is illustrated by way of example, and not of limitation, in the figures of the accompanying drawings.

DETAILED DESCRIPTION

A USB type-C receptacle, with capabilities of up-side down connection and accessible to external physical connectors, may access interface circuitry for reverse detection, multiplexers for flip correction, and IEC electrostatic discharge (ESD) protection. The data lines (DP/DM, also denoted as D+/D−) may employ additional sensing for battery charging and USB2.0 high-speed signaling. There is presently no one-die solution (e.g., a single integrated circuit chip) for these capabilities. Accordingly, a hardware manufacture that incorporates USB technology may need to use external components for one or another capability, which may degrade the high-speed signaling and increase costs, for example.

In various embodiments, a device may include a USB-C controller instantiated as a first integrated circuit (e.g., implemented as an instance on a single integrated circuit) that includes a first set of terminals to be coupled to host controllers and a second set of terminals to be coupled to sets of D+/D− terminals of a type-C receptacle. A D+/D− multiplexer may selectively couple the first set of terminals to the second set of terminals. An electrostatic discharge (ESD) protection circuit may be coupled between the D+/D− multiplexer and the second set of terminals. A charger detector circuit may be coupled between a positive data system terminal and a negative data system terminal of the first set of terminals, the charger detector circuit to detect whether the second set of terminals is coupled to a USB charger through the type-C receptacle. When terminals are referred to herein, reference is understood to be made to integrated circuit terminals, metal lines, pins, and other input/output connectors, depending on implementation.

Figure 1:
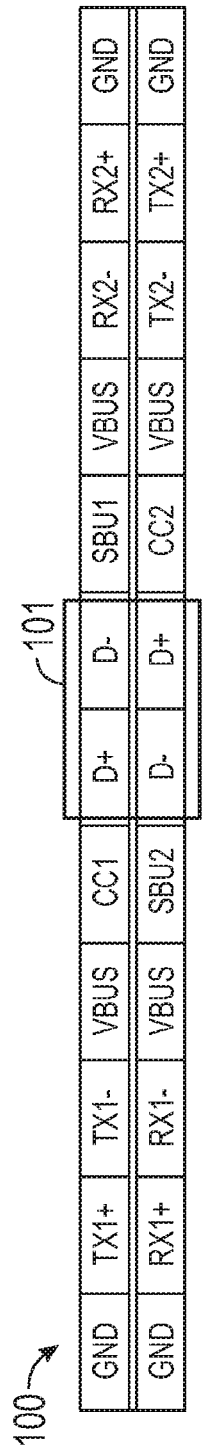
FIG. 1 is a block diagram of a USB type-C (USB-C) connector according an embodiment.

FIG. 1 is a block diagram of a USB type-C (USB-C) connector 100 according an embodiment. Many of the terminals on the USB-C connector 100 are replicated on the top and on the bottom so that the USB-C connector may fit into a USB-C receptacle right side up or up-side down and still function. Those familiar with the USB-C standard will recognize these terminals, and with particular reference to the present disclosure, the positive data terminals (D+) and the negative data terminals (D−), highlighted with a box 101, which may be coupled to a USB 2.0 data bus. Additional terminals include ground terminals (GND), VBUS terminals, sideband use terminals (SBU1, SBU2), channel configuration terminals (CC1, CC2), and USB 3.1 transceiver/receiver terminals (TX/RX). The CC terminals may enable cable attach detection, cable orientation detection, role detection, and current-mode detection, e.g., standard mode or alternate mode.

The unused CC terminal may become the VCONN terminal, which may supply power to USB-C controller chips in active cables or adaptors. The VBUS terminal may be used for the cable bus power and GND terminal for the cable ground. The SBU terminals may be for communicating with other-than-USB protocols in alternate mode, such as with the DisplayPort (DP) protocol, high-definition multimedia interface (HDMI) protocol, the Thunderbolt® (TBT) protocol, the mobile high-definition link (MHL) protocol, and the Peripheral Component Interconnect Express (PCIe) protocol, and the like.

With additional reference to FIG. 1, the position of each D+ terminal and each D− terminal may be flipped between the top and the bottom of the USB-C receptacle. This is due to the USB Type-C specification definition a Type-C port, which may be associated with a Type-C plug or a Type-C receptacle. For ease of use, the Type-C plug and the Type-C receptacle are designed as a reversible pair that operates regardless of the plug-to-receptacle orientation. Accordingly, a USB-C controller may include multiplexing between top and bottom duplicate terminals depending on the orientation of the USB-C connector placed therein. Further, a configuration channel (CC) signal may be transmitted through either of the CC1 or the CC2 terminals, which may follow CC protocol for flip correction, so as to signal the multiplexers which set of terminals to select as will be discussed in detail.

Figure 2A:
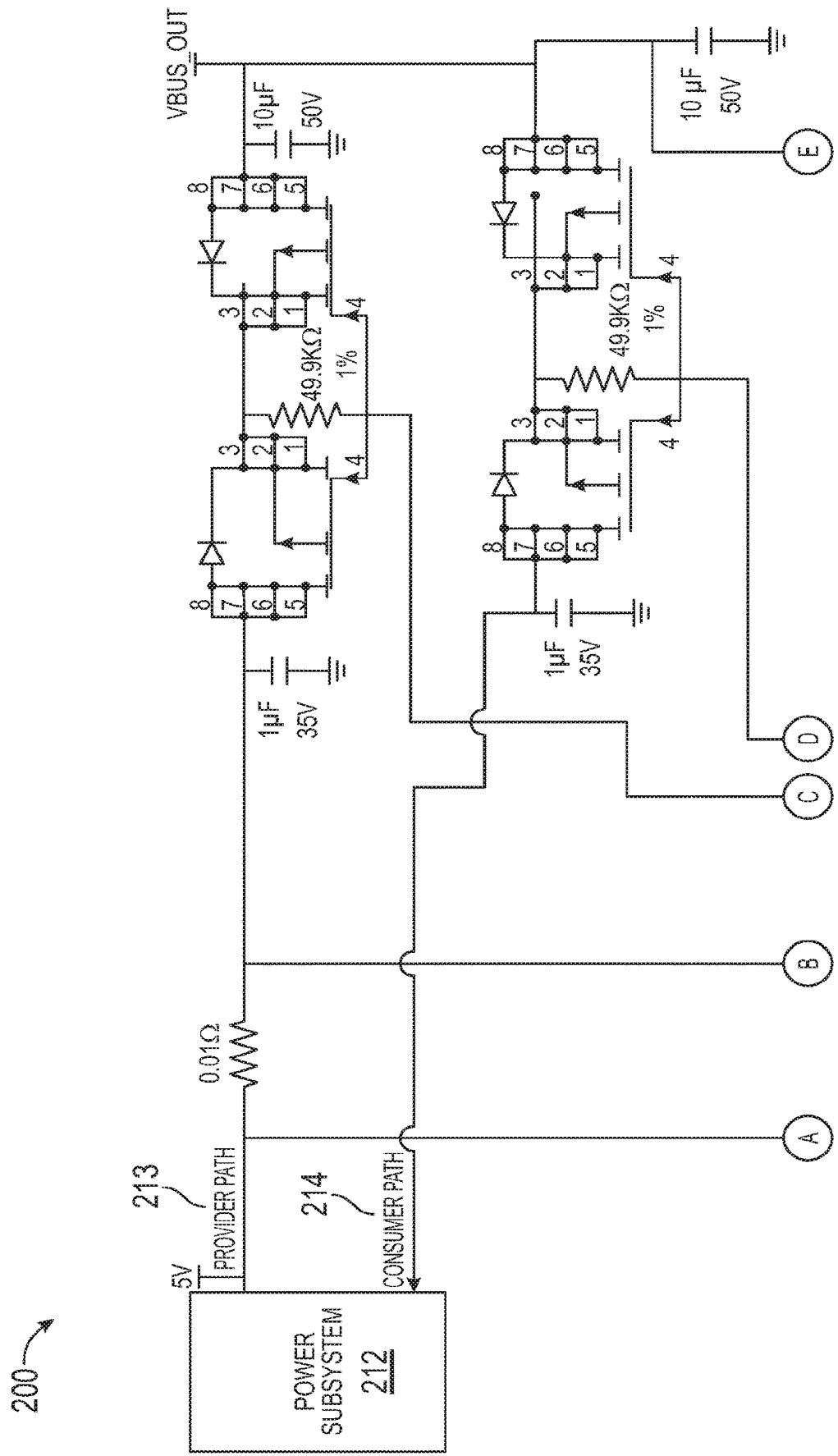
FIG. 2 is a circuit diagram of a single port Thunderbolt® (TBT) notebook power source/sink circuit, according to an embodiment.
Figure 2B:
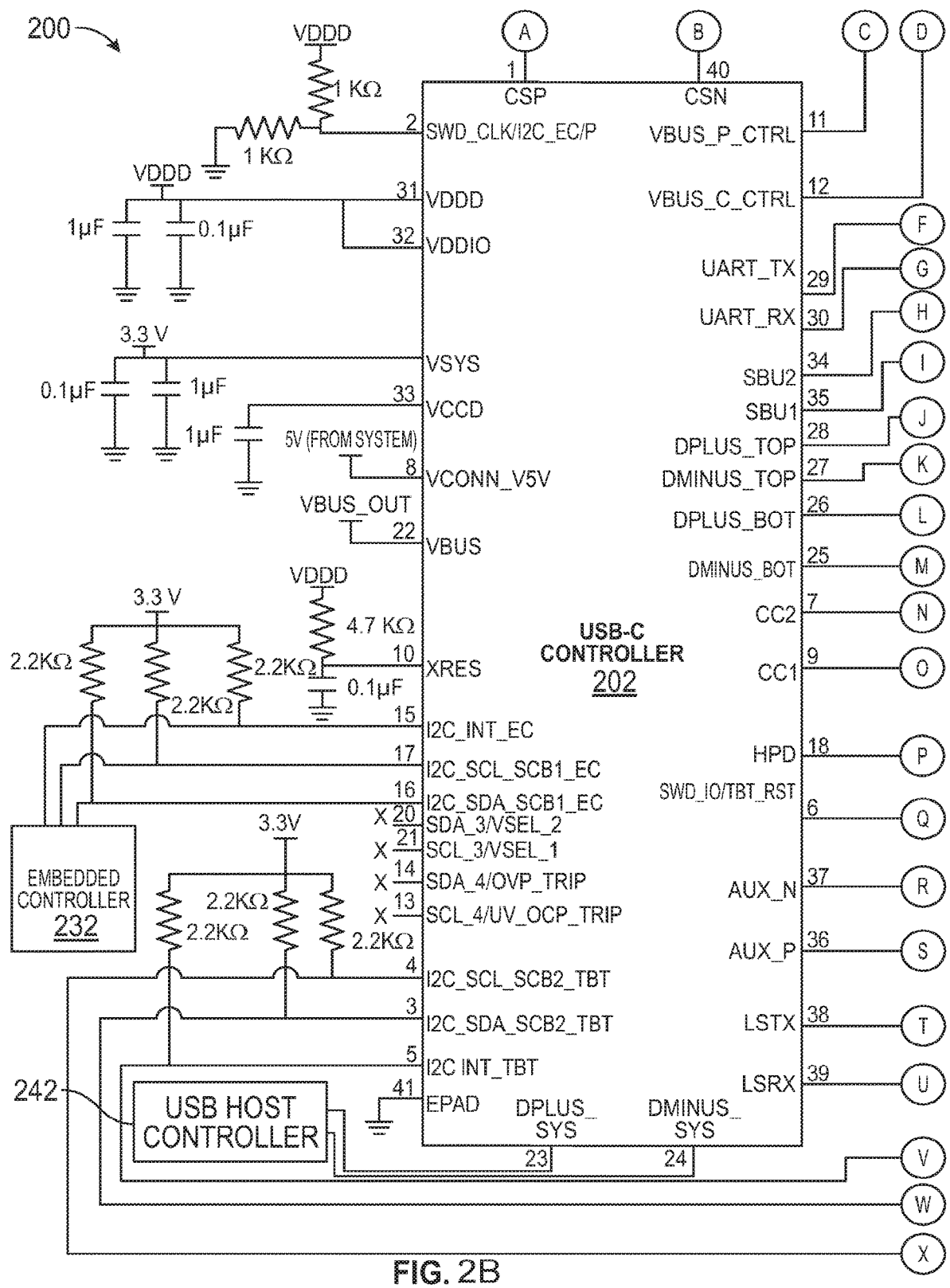
Figure 2C:
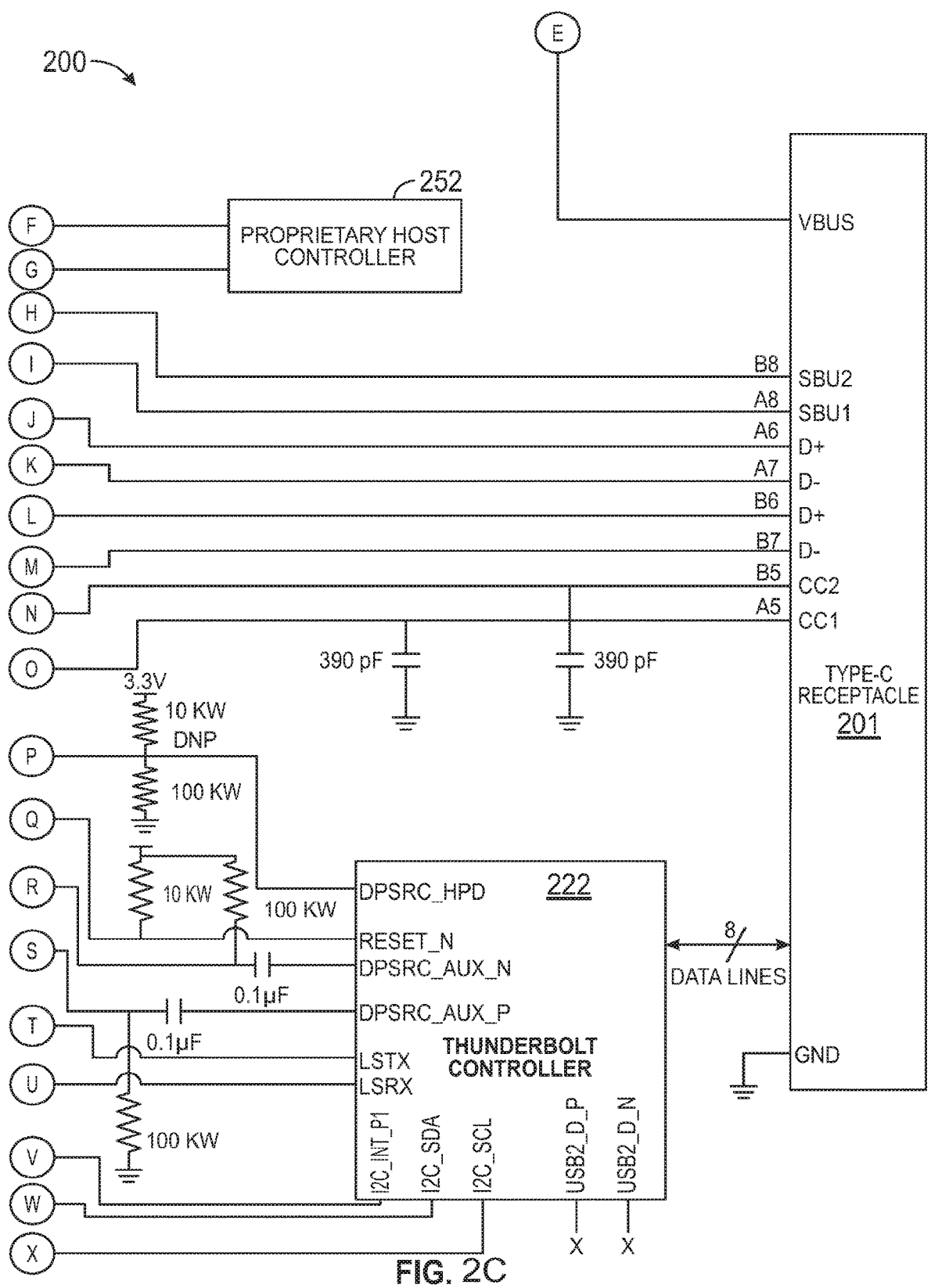

FIG. 2 is a circuit diagram of a single port Thunderbolt® (TBT) notebook power source/sink circuit 200, according to an embodiment, for system context of where the disclosed type-C signal interface circuit may be employed. The type-C signal interface circuit may also be employed in other USB type-C devices and systems. In embodiments, the circuit 200 may include a type-C receptacle 201, a USB-C controller 202, a power subsystem 212, a TBT controller 222, an embedded controller 232, a USB host controller 242, and a proprietary host controller 252. In embodiments, the disclosed type-C signal interface circuit may be employed as a part of or integrated within the USB-C controller 202. The power subsystem 212 may provide a five volt (5V) provider path 213, to generate VBUS OUT for use by other USB-C circuitry, and a power consumer path 214 to power the power subsystem 212.

In various embodiments, the type-C receptacle 100 may contain terminals that correspond to the terminals of the type-C connector 100 of FIG. 1, e.g., VBUS, SBU1, SBU2, D+/D− (top), D+/D− (bottom), CC2, CC1, and GND. These terminals may be coupled to corresponding terminals on the USB-C controller 202, respectively, the VBUS_C_CTRL, SBU2, SBU1, DPLUS_TOP, DMINUS_TOP, DPLU_BOT, DMINUS_BOT, CC2, and CC1 terminals. The USB-C controller 202 may be configured for alternate mode operation, which enables other communication protocols, which was just discussed.

As illustrated, the USB-C controller 202 may include a number of additional connections and circuitry, not all that are relevant here, and may be manufactured as a single integrated circuit. Note the additional negative auxiliary terminal (AUX_N), positive auxiliary terminal (AUX_P), TBT transmit control signal terminal (LSTX), and TBT receive control signal terminal (LSRX) on the USB-C controller 202 may be coupled to corresponding terminals on the TBT controller 222. The AUX_N, AUX_P terminals may provide auxiliary signals for DisplayPort signaling and the LSTX, LSRX terminals may provide TBT link management using Universal Asynchronous Receiver-Transmitter (UART)-based technology, for example. Furthermore, a positive data system terminal (e.g., DPLUS_SYS) and a negative data system terminal (e.g., DMINUS_SYS) of the USB-C controller 202 may be coupled to system data lines that are routed to the USB host controller 242. A data transmitter terminal (e.g., UART_TX) and a data receiver terminal (e.g., UART_RX) may be coupled to the proprietary host controller 252. The proprietary host controller 252 may be a proprietary controller such as a test and debug controller of a host computing system in which the circuit 200 is located, e.g, the notebook or other computing system that hosts the USB-C controller 202.

In various embodiments, the embedded controller 232 may be coupled to the USB-C controller 202 through, for example, an inter-integrated circuit connection (I2C), e.g., a synchronous, multi-master, multi-slave, packet switched, single-ended, or a serial computer bus. The USB-C controller 202 may include an I2C address that is determined by the SWD_CLK terminal.

The USB-C controller 202 may communicate with the power subsystem 212 over I2C, which manages the power provided to the upstream type-C ports. The USB-C controller 202 may also update the TBT controller 222 over I2C based on the alternate mode negotiation to sink Thunderbolt® or USB or DisplayPort protocol data. The USB-C controller 202 may control the transfer of USB 2.0 D+/D− lines from the top and bottom of the type-C receptacle 201 to the D+/D− lines of the TBT controller 222. The USB-C controller 202 may also handle the routing of SBU1 and SBU2 lines from the type-C receptacle 201 to the TBT controller 222 for the link management. In embodiments, the USB-C controller 202 may offer on-chip ESD protection on D+/D− and SBU lines as well as on-chip VBUS Short protection on SBU and CC lines. Some of these capabilities will be discussed in more detail below.

Figure 3:
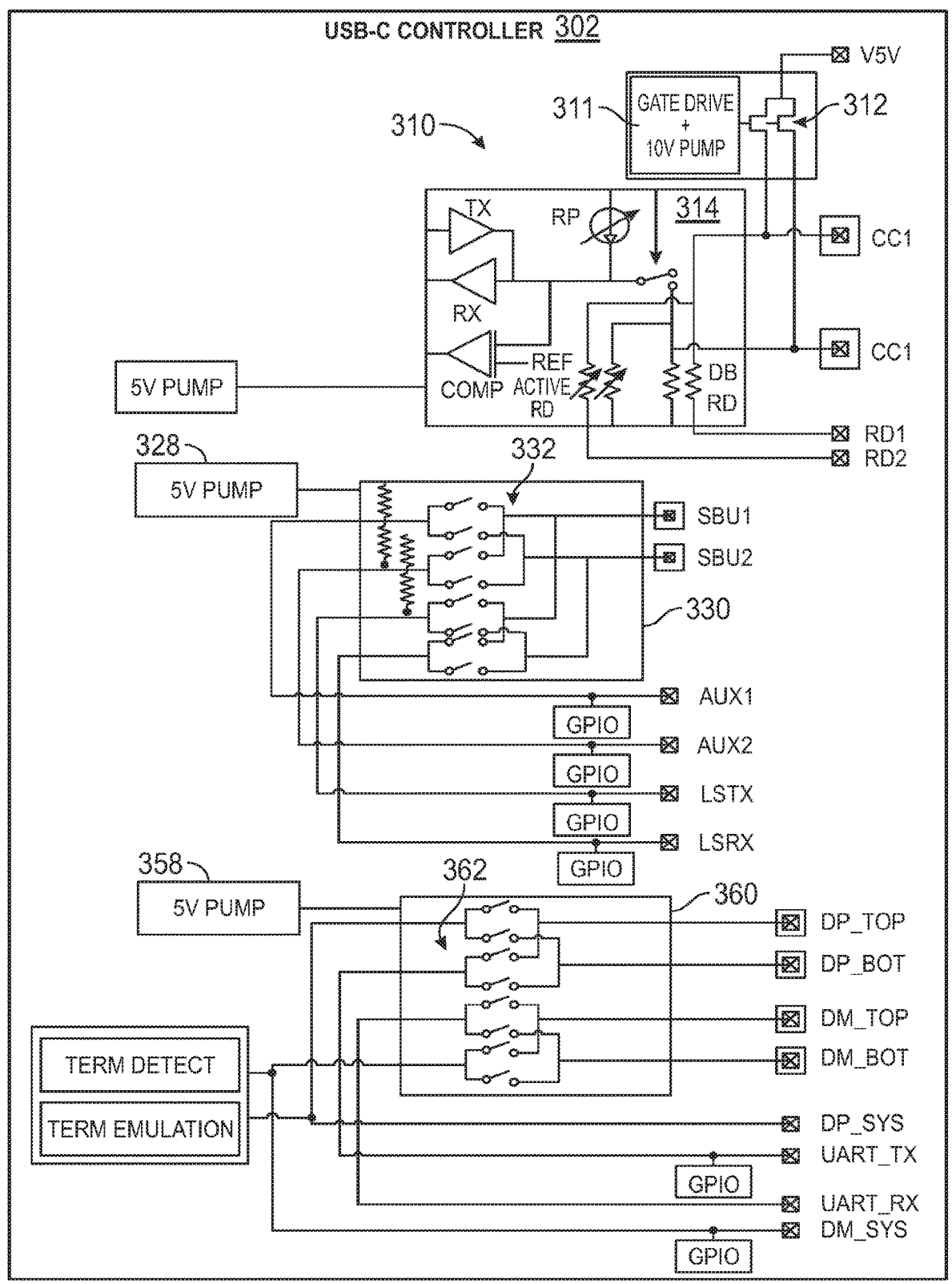
FIG. 3 is a circuit diagram of sub-portions of a USB-C controller according to an embodiment.

FIG. 3 is a circuit diagram of sub-portions of a USB-C controller 302, associated with a single port, according to an embodiment. In one embodiment, the USB-C controller 302 is the USB-C controller 202 of FIG. 2. The USB-C controller 302 may include a configuration channel (CC) interface circuit 310, a USB-C sideband signal interface circuit 330, and a USB-C D+/D− interface circuit 360.

In various embodiments, the CC interface circuit 310 may include a gate drive and 10V charge pump 311 and a pair of transistor switches 312 to enable VCONN functionality on CC1/CC2 depending on the connector direction. Either of CC1 or CC2 may be used for CC protocol and the other one may be connected to V5V using 312 switches to give power to the cable. The CC interface circuit 310 may further include reference circuitry 314 to compare and detect certain types of signals received through the CC1 and CC2 terminals, and to generate outgoing control signals over the CC1 and CC2 terminals.

In some embodiments, the USB-C sideband signal interface circuit 330 may include a four-by-two multiplexer 332 with resistance isolation on the inputs and having switches driven using a 5V charge pump 328. The four-by-two multiplexer 332 may selectively couple a first pair of terminals (e.g., AUX1, AUX2 terminals) to a pair of SBU terminals (e.g., SBU1, SBU2), and selectively couple a second pair of terminals (e.g., LSTX, LSRX terminals) to the pair of SBU terminals (e.g., SBU1, SBU2). The general purpose input/output (GPIO) boxes may be adapted to receive communication links of protocols other than USB. In one embodiment, the switches of the four-by-two multiplexer 332 are metal-oxide-semiconductor field-effect transistors (MOSFETs), e.g., specifically low-voltage n-type field effect transistors (LVNFETs). In one embodiment, the charge pump 328 may drive the gates of the LVNFETs such that the LVNFETs each operate in a linear region and exhibit less than a seven-ohm resistance.

In some embodiments, a USB-C D+/D− interface circuit 360 may include a four-by-four multiplexer 362 that includes switches that are also driven by a 5V charge pump 358. The four-by-four multiplexer 362 may selectively couple the positive data system terminal (DP_SYS) to one of the first and second positive data terminals (DP_TOP, DP_BOT), the data transmitter terminal (UART_Tx) to one of the first and second positive data terminals (DP_TOP, DP_BOT), the negative data system terminal (DM_SYS) to one of the first and second negative data terminals (DM_TOP, DM_BOT), and the data receiver terminal (UART_Rx) to one of the first and second negative data terminals (DM_TOP, DM_BOT).

In one embodiment, the switches of the four-by-four multiplexer 362 are MOSFETs, e.g., specifically n-type field effect transistors (NFETs). The 5V pump 528 may be a low-ripple charge pump (e.g., low-ripple 5V charge pump) coupled to gates of the MOSFETs of the four-by-four multiplexer 362. The low-ripple charge pump may drive the MOSFETs to operate in a linear region and such that each MOSFET exhibits less than seven-ohm resistance.

In embodiments, the high-speed operation of the disclosed USB-C controllers may meet USB2.0 high-speed data rates with signaling rates of 480 Mbps, USB2.0 full-speed data rates with signaling rates of 12 Mbps, may provide UART signaling, and provide access to a battery charger for USB devices.

Figure 4:
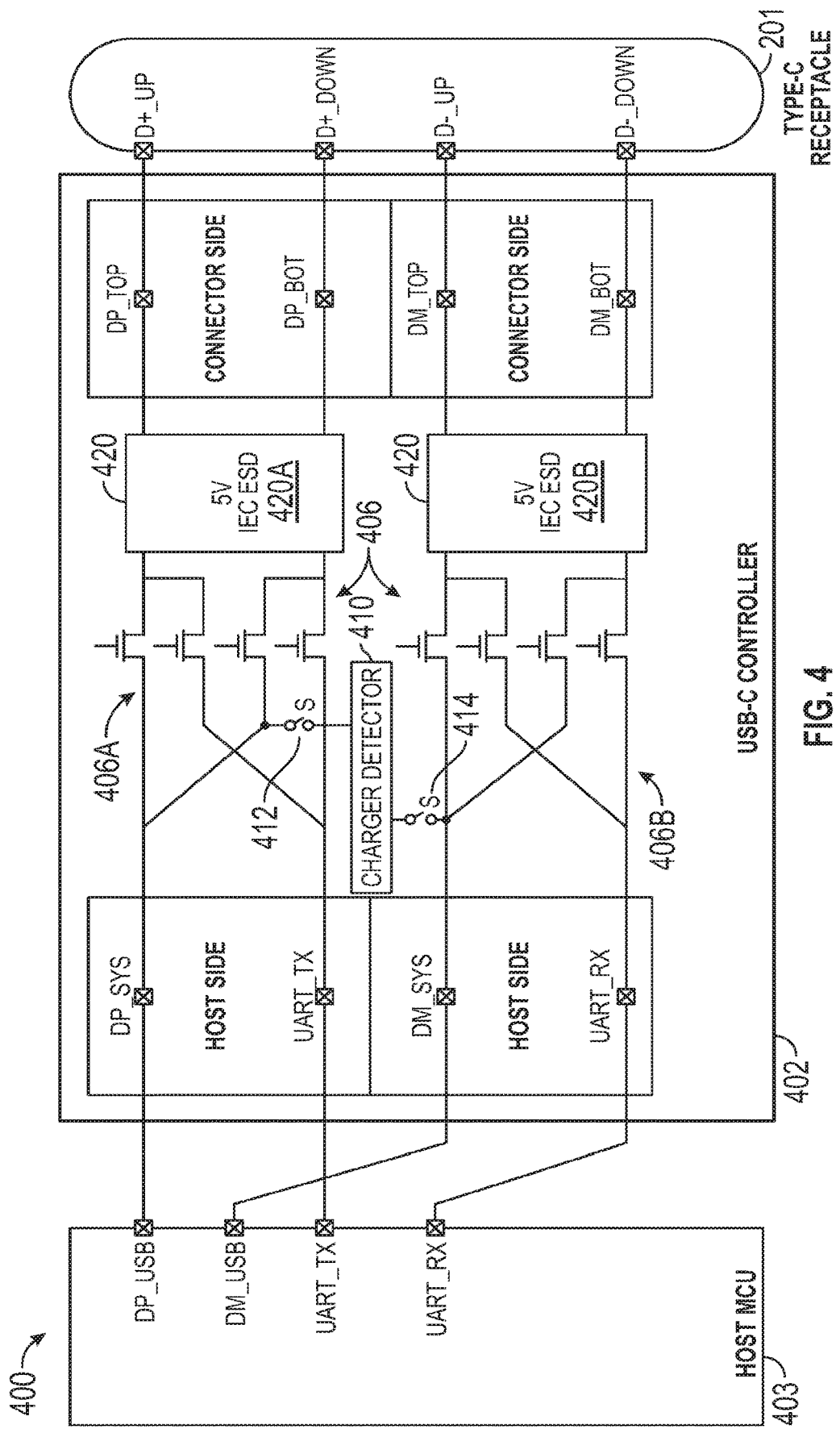
FIG. 4 is a circuit diagram illustrating a system having a USB-C controller according to another embodiment.

FIG. 4 is a circuit diagram illustrating a system 400 having a USB-C controller 402 according to another embodiment. In one embodiment, the USB-C controller 402 is the USB-C controller 202 of FIG. 2 or the USB-C controller 302 of FIG. 3. The system 400 may further include a host microcontroller unit (MCU) 403 and the type-C receptacle 201 (FIG. 2). The type-C receptacle 201 may include sets of D+/D− terminals, e.g., D+_UP and D+_DOWN (the top and bottom positive signal terminals) and D−_UP and D−_DOWN (the top and bottom negative signal terminals). The host MCU 403 may include a pair of host controllers, such as the USB host controller 242 and the proprietary host controller 252, with corresponding controller terminals. The USB host controller 242 may include a positive controller terminal (DP_USB) and a negative controller terminal (DM_USB). The proprietary host controller 252 may include a transmission controller terminal (UART_TX) and a reception controller terminal (UART_RX).

In various embodiments, the USB-C controller 402 includes a first set of terminals coupled to the sets of host controller terminals of the host MCU 403 and a second set of terminals coupled to sets of D+/D− terminals of the type-C receptacle 201. For example, the first set of terminals may include positive data system terminal (DP_SYS) and a negative system terminal (DM_SYS) coupled to the DP_USB and DM_USB terminals, respectively, of the host MCU 403. Furthermore, the first set of terminals may include a data transmitter terminal (UART_TX) and a data receiver terminal (UART_RX) coupled to the corresponding UART_TX and UART_RX terminals of the host MCU 403. In embodiments, the second set of terminals includes a first positive data terminal (DP_TOP) coupled to the D+_UP terminal, a second positive data terminal (DP_BOT) coupled to the D+_DOWN terminal, a first negative data terminal (DM_TOP) coupled to the D−_UP terminal, and a second negative data terminal (DM_BOT) coupled to the D−_DOWN terminal of the type-C receptacle 201.

In the various embodiments, the USB-C controller 402 includes a D+/D− multiplexer 406, which may be made up of a first set of four n-type field effect transistors (NFETs) 406A and a second set of four NFETs 406B. The D+/D− multiplexer 406 may selectively couple the first set of terminals to the second set of terminals in a way that enables flip correction between top and bottom terminals of the USB-C connector 100. The NFETs of the D+/D− multiplexer 406 may be controlled through the CC signal using CC protocol.

More specifically, the multiplexer 406 may selectively couple the positive data system terminal (DP_SYS) to one of the first and second positive data terminals, the data transmitter terminal (UART_TX) to one of the first and second positive data terminals, the negative data system terminal (DM_SYS) to one of the first and second negative data terminals, and selectively couple the data receiver terminal (UART_RX) to one of the first and second negative data terminals.

In one embodiment, the positive data system terminal (DP_SYS) and the negative data system terminal (DM_SYS) are associated with a first USB host port connection of a single USB port. In this embodiment, the data transmitter terminal (UART_TX) is a second positive data system terminal and the data receiver terminal (UART_RX) is a second negative data system terminal. These second positive and negative data system terminals may be associated with a second USB host port connection of the single USB port.

In this way, the D+/D− multiplexer 406 may enable the use of both top and bottom D+/D− terminals of the USB connector together at the same time. For example, the multiplexing may provide the ability for a small USB-C host device, which has sufficient room for only one (or perhaps two) USB-C ports, to connect two different USB devices to the USB-C host devices via a single USB port. In one embodiment, a special split USB cable may be employed that connects into the single USB port of the USB-C host device and into USB ports of the two different USB devices.

Furthermore, the use of both the top and bottom D+/D− terminals of the USB connector may facilitate the enhancement of the quality of the high-speed data signal through the USB-C controllers and the connectors. This may be performed through sending a diagnostics signal through the unused D+/D− terminals, e.g., a command from a USB device to boost the USB signal for better detection of the USB device. Other diagnostic signals may also be sent. The advantage of sending a diagnostic signal in this way may be that the diagnostic signal need not be sent through the entire USB-C controller (and its other signaling circuitry) to assert an action or improve detection or performance. Protocols that may operate over the unused D+/D− terminals include RS232 as well as other interconnect protocols. Furthermore, the availability of both the top and bottom D+/D− terminals of the USB connector for data transmission may be applied to double the data rate of any existing protocol. Since the D+/D− multiplexer may have four lane outputs possible at any time, the output rate may be doubled by sending the high-speed data across both the top and bottom data lines for the same communication link.

The USB-C controller 402 may further include a charger detector circuit 410 selectively coupled between a positive data system terminal and a negative data system terminal of the first set of terminals. The charger detector circuit 410 may detect whether a device coupled to the second set of terminals, through the type-C receptacle 201, includes a USB charger and thus contains a battery to be charged rather than connected for high-speed data transfer. The charger detector circuit 410 may include a first switch 412 coupled to the positive data system terminal (DP_SYS) and a second switch 414 coupled to the negative data system terminal (DM_SYS) to facilitate the selective coupling just referenced. In one embodiment, the first switch 412 and the second switch 414 are controllable by first logic (e.g., firmware, state machine, or other logic) to disconnect the charger detector circuit 410 during high-speed data transfer of the USB-C controller, which reduces the battery charging capacitive load on the D+/D− lines and maintains better signal integrity.

In various embodiments, after connection by the USB device and the charger detector circuit 410 detects whether to perform charging or high-speed data transfer, the charger detector circuit 410 may open the first and second switches 412, 414 to disconnect the charger detector circuit 410. Alternatively, the charger detector circuit 410 may be disconnected after a set time window or upon a predetermined signal from the first logic.

The USB-C controller 402 may further include an IEC electrostatic discharge (ESD) protection circuit 420 coupled between the D+/D− multiplexer 406 and the second set of terminals, e.g., the DP_TOP, DP_BOT, DM_TOP, and DM_BOT terminals. The IEC ESD protection circuit 420 may provide ±8 KV of contact discharge protection and ±15 KV of air gap discharge protection based on IEC61000-4-2 level 4C protection. The IEC ESD protection circuit 420 may be separated into a first IEC ESD protection circuit 420A coupled to the first set of four NFETs 406A and a second IEC ESD protection circuit 420B coupled to the second set of four NFETs 406B. The IEC ESC protection circuit 420 may protect against electrostatic discharge and provide better signal integrity for high-speed signals, and avoid extra routing at board level, which would otherwise be required if located on a second integrated circuit chip from the chip on which the multiplexer is disposed.

The present design of the disclosed USB-C controllers may have added challenges due to the added circuitry. For example, high-speed switches (the NFETs) of the D+/D− multiplexers should be of low resistance to meet the high-speed eye diagram. The resistance may be minimized by increasing the switch size, but with increased switch size may also result in increased switch capacitance on high-speed data lines. Increased capacitances may cause the high-speed eye diagram to fail. Accordingly, a balance in the switch size is sought to reduce DP/DM self-capacitances and mutual-capacitances. Reducing switch size may help meet the high-speed eye diagram and cross-talk performances and by reducing the capacitance created by sources and drains of the NFETs.

Further, to reduce resistance and capacitance simultaneously, the MOSFET's (NFETs) of the switches of the D+/D− multiplexers may be operated in a linear region by using the 5V charge pump to meet less than seven ohm resistance of each NFET. Using the charge pump for high-speed transmission may cause a high swing at the charge pump output and thus corrupt the high-speed data. High swing at the charge pump may be resolved by using a low-ripple charge pump.

In embodiments, a high-speed data line is to have as minimum loading as possible for purposes of speed. Integrating a USB high-speed data line with additional circuitry may include risks as the USB high-speed data line may already be loaded with the high-speed driver load and a battery charger load. Any increase in the loading may impact the performance of the high-speed eye diagram.

Furthermore, adding IEC ESD clamps to the high-speed data lines may present a large capacitance on the data lines that may further affect the high-speed eye diagram performance. As illustrated in FIG. 4, each data lane may be connected to an on switch and an off switch while in operation. The first and second switches 412, 414 may add the load of two off switches to an already loaded line. Additionally, the signaling range of a high-speed signal is about plus or minus 400 mV. A UART is a single-ended mode of signaling with a swing of 3.3V. Any coupling from one end of the off switch to the other may corrupt the high-speed data.

To reduce the ESD clamp loading, series diodes (discussed with reference to FIG. 5B) may be employed to isolate the clamp in normal operating conditions and reduce the capacitance without impacting the ESD performance. The loading of the charger detector circuit 410 may be minimized by using firmware-controlled switches (for the first switch 412 and the second switch 414) for the path between high-speed data lines and the battery charger on a USB device or adaptor. These logic-controlled switches may be kept off during high-speed data traffic. To improve signal integrity from the coupling due to power supplies and off switches, decoupling of sources and drains of NFET switches may be achieved using maximum metal spacing (e.g., two times the metal spacing) and grounded metal shields between the sources and drains of the NFET switches. Further, source/drain coupling to gate may be reduced by isolating gates using resistances. To do so, an inverter may be used to drive each NFET, and a resistance (such as a 2K-ohm resistance) may be added to the inverter's pull-up path, e.g., between the drain and output going to the NFET's gate. No resistance may be added to the inverter's pull-down path to ensure that the NFET switches, when disabled, are pulled down strongly. The resistance added to the pull-up path is to avoid coupling of one gate to another gate.

Figure 5A:
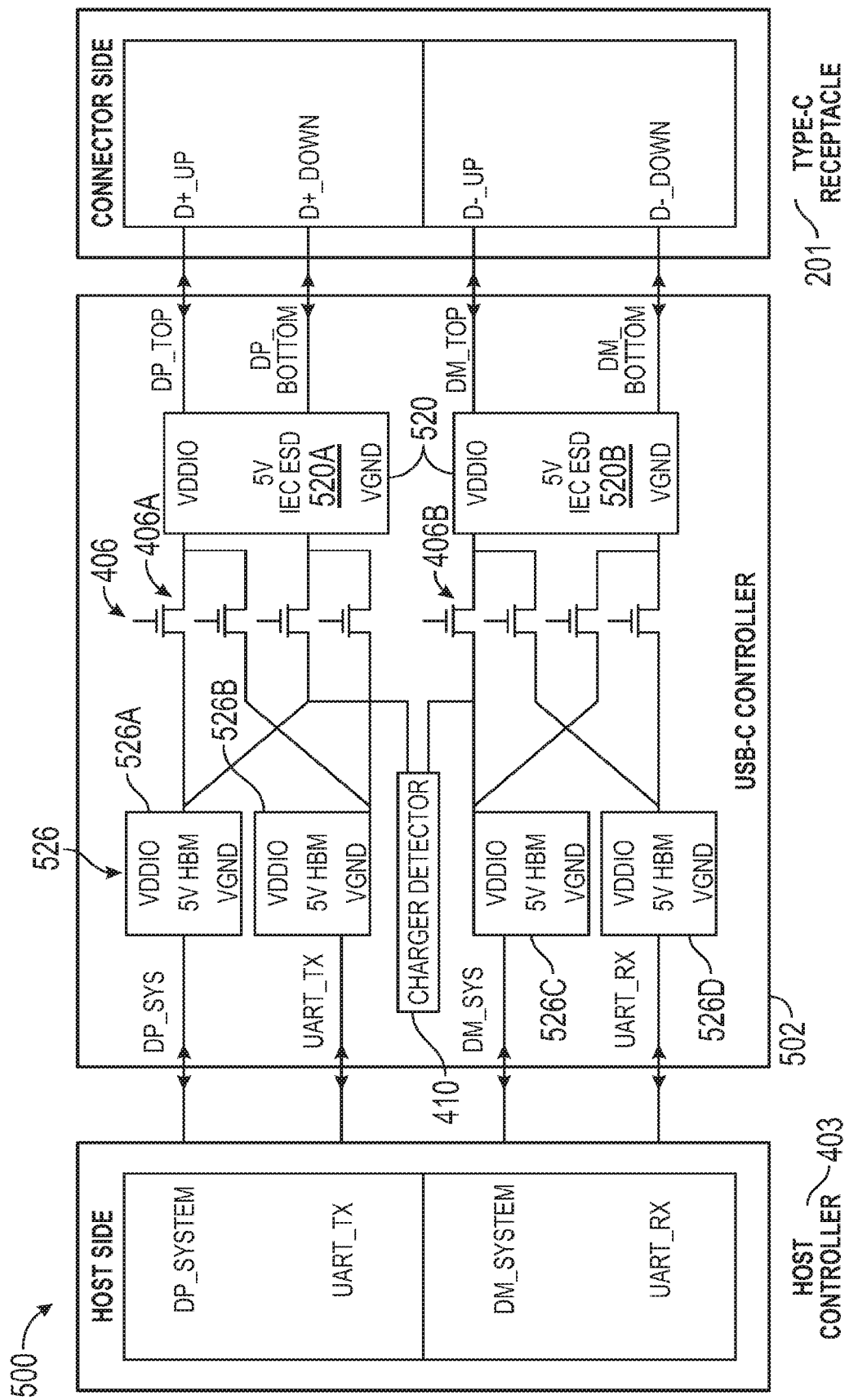
FIG. 5A is a circuit diagram of a system having a USB-C controller according to yet a further embodiment.

FIG. 5A is a circuit diagram of a system 500 having a USB-C controller 502 according to yet a further embodiment. The system 500 is similar to the system 400 of FIG. 4, as indicated by the same or similar circuit elements. The USB-C controller 502 may also be similar to the USB-C controller 402 of FIG. 4. In one embodiment, the USB-C controller 502 includes the D+/D− multiplexer 406, an IEC ESD protection circuit 520 coupled to the connector side of the D+/D− multiplexer 406, and additional ESD protection circuitry 526 coupled to the system side of the D+/D− multiplexer 406. The additional ESD protection circuitry 526 may include first, second, third, and fourth system ESD protection circuitry 526A, 526B, 526C, and 526D, respectively. The IEC ESD protection circuit 520 may provide 8 KV of protection and be separated into a first IEC ESD protection circuit 520A coupled to the first set of four NFETs 406A and a second IEC ESD protection circuit 520B coupled to the second set of four NFETs 406B, for example. The IEC ESD protection circuit 520 and the additional ESD protection circuitry 526 may provide ESD clamp isolation using the illustrated diodes (FIGS. 5B, 5C, and 5D) to reduce capacitances.

Figure 5B:
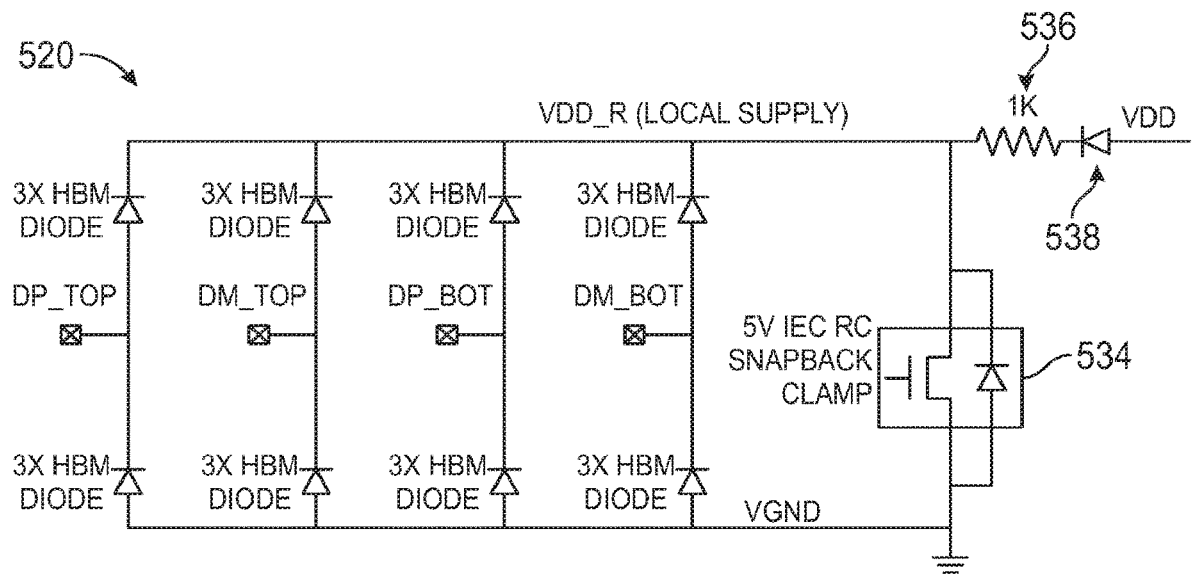
FIG. 5B is a circuit diagram of an IEC electrostatic discharge (ESD) protection circuit of the USB-C controller of FIG. 5A according an embodiment.

FIG. 5B is a circuit diagram of the ESD protection circuit 520 of the USB-C controller 502 of FIG. 5A according an embodiment. In this embodiment, the ESD protection circuit 520 includes a five volt, IEC ESD RC snapback clamp 534 coupled between a local power supply and ground. The ESD protection circuit 520 may further include at least one Human Body (HBM) diode coupled between the local power supply and each of the first positive data terminal (DM_TOP), the first negative data terminal (DM_TOP), the second positive data terminal (DP_DOWN), and the second negative data terminal (DM_DOWN). The ESD protection circuit 520 may further include at least one HBM diode coupled between the ground and each of the first positive data terminal, the first negative data terminal, the second positive data terminal, and the second negative data terminal.

In a related embodiment, the ESD protection circuit 520 may further include a first set, a second set, a third set, and a fourth set of HBM diodes coupled between the local power supply and the first positive data terminal, the first negative data terminal, the second positive data terminal, and the second negative data terminal, respectively. In one example, each set of diodes is a set of three diodes although another number of diodes is envisioned. The ESD protection circuit 520 may further include a fifth set, a sixth set, a seventh set, and an eighth set of HBM diodes coupled between the ground and the first positive data terminal (DP_TOP), the first negative data terminal (DM_TOP), the second positive data terminal (DP_DOWN), and the second negative data terminal (DM_DOWN), respectively. In one example, each set of diodes is a set of three diodes. The ESD protection circuit 520 may further include a resistor 536 and a supply diode 538 between the IEC ESD RC snapback clamp 534 and VDD, to bias VDD_R local supply to a known voltage of VDD minus diode drop.

Figure 5C:
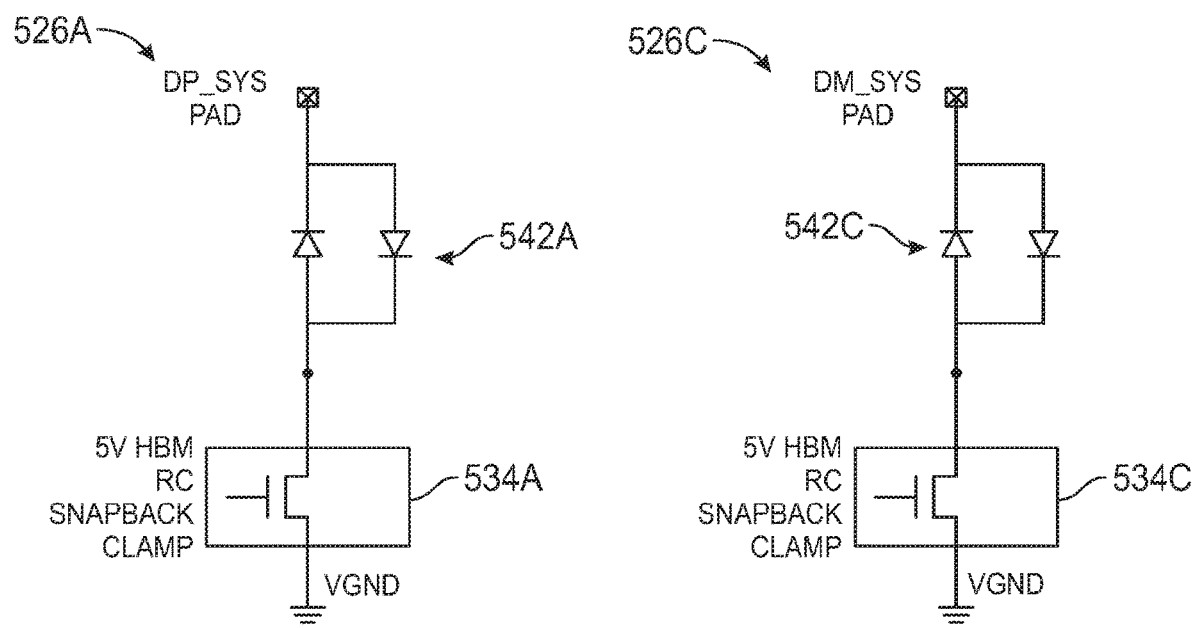
FIG. 5C and FIG. 5D are circuit diagrams of additional ESD protection circuity on the system side of the USB-C controller of FIG. 5A according to an embodiment.
Figure 5D:
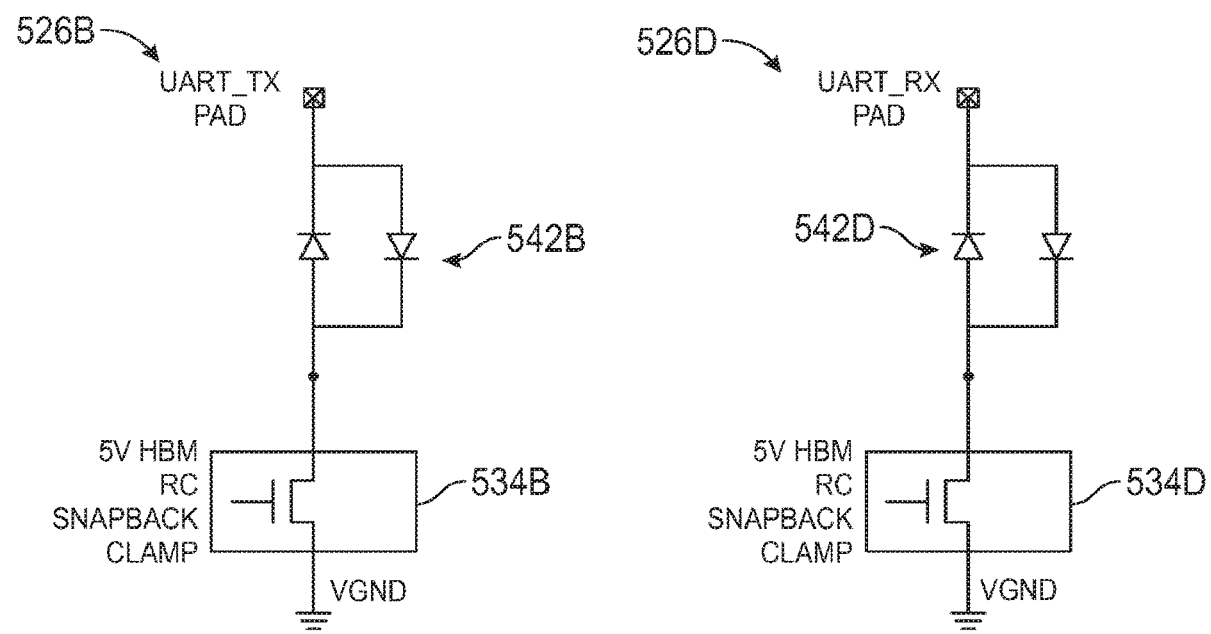

FIG. 5C and FIG. 5D are circuit diagrams of additional ESD protection circuity on the system side of the USB-C controller of FIG. 5A according to an embodiment. In various embodiments, the additional ESD protection circuitry includes additional system ESD protection circuitry for each of the first set of terminals coupled to the host controllers, e.g., for each of the positive data system terminal (DP_SYS), the negative data system terminal (DM_SYS), the data transmitter terminal (UART_TX), and the data receiver terminal (UART_RX).

More specifically, with reference to FIG. 5C, first system ESD protection circuitry 526A may include a first human body model (HBM) snapback clamp 534A coupled to a ground and a first pair of diodes 542A connected in series and coupled between the first HBM snapback clamp 534A and the positive data system terminal (DP_SYS). Further, second system ESD protection circuitry 526C may include a second HBM snapback clamp 534C coupled to the ground and a second pair of diodes 542C connected in series and coupled between the second HBM snapback clamp 534C and the negative data system terminal (DM_SYS).

With additional reference to FIG. 5D, third system ESD protection circuitry 526B may include a third HBM snapback clamp 534B coupled to the ground and a first pair of diodes 542B connected in series and coupled between the third HBM snapback clamp 534B and the data transmitter terminal (UART_TX). Further, fourth system ESD protection circuitry 526D may include a fourth HBM snapback clamp 534D coupled to the ground and a second pair of diodes 542D connected in series and coupled between the fourth HBM snapback clamp 534D and the data receiver terminal (UART_RX). In embodiments, the pairs of diodes employed in the system ESD protection circuitry may be standard diodes or HBM diodes depending on level of ESD protection desired. These additional pairs of diodes 542A, 542B, 542C, and 542D may reduce capacitive load of the HBM snapback clamps 534A, 534B, 534C, and 534D, respectively.

Figure 6:
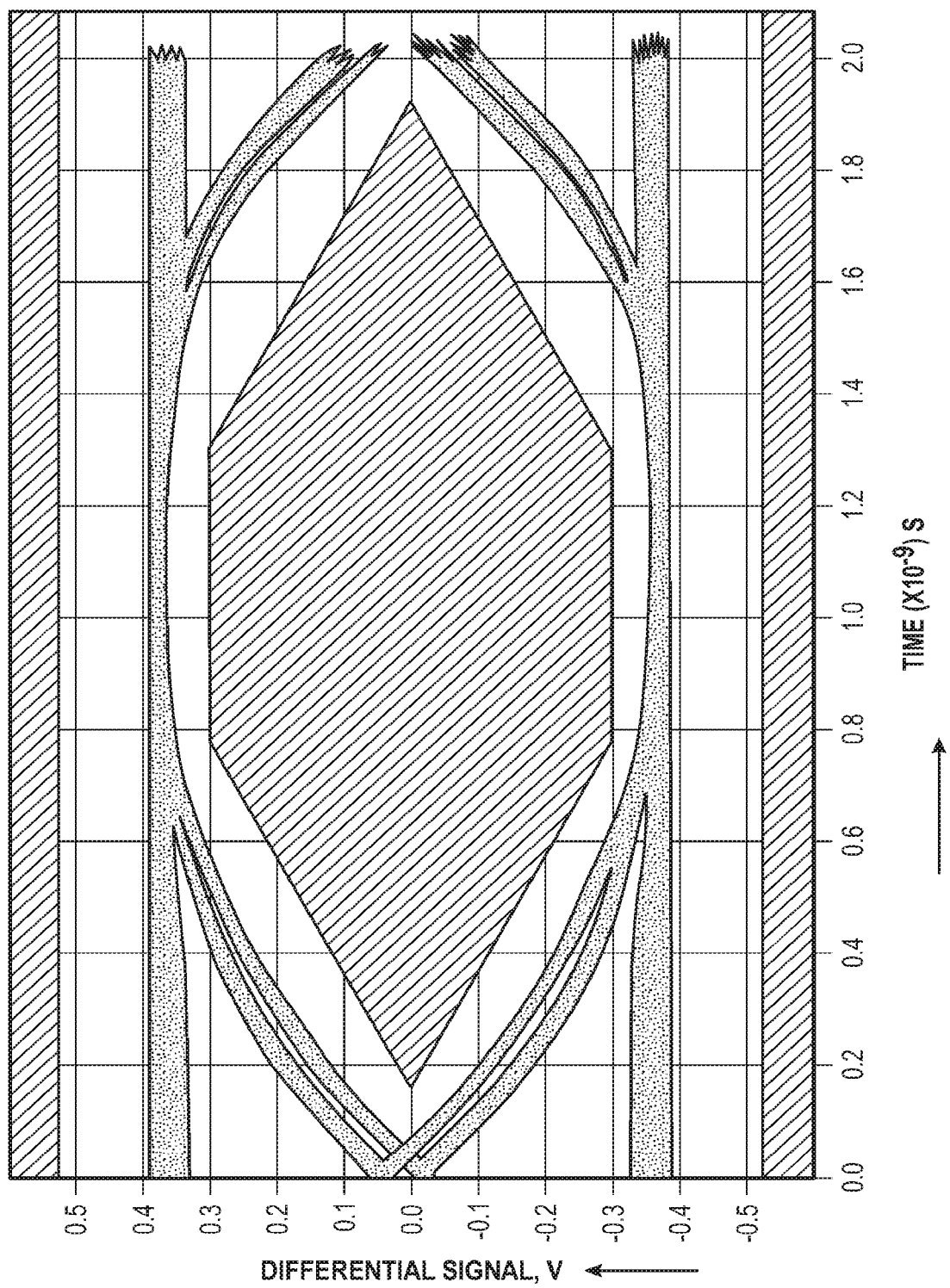
FIG. 6 is an eye diagram, verified on silicon, illustrating results from high-speed data multiplexing of the disclosed USB-C controllers according to an embodiment.

FIG. 6 is an eye diagram, verified on silicon, illustrating results from high-speed data multiplexing of the disclosed USB-C controllers according to an embodiment. Note the large eye opening in the eye diagram is indicative of good high-speed performance of the multiplexing that includes the IEC ESD protection circuitry.

Figure 7:
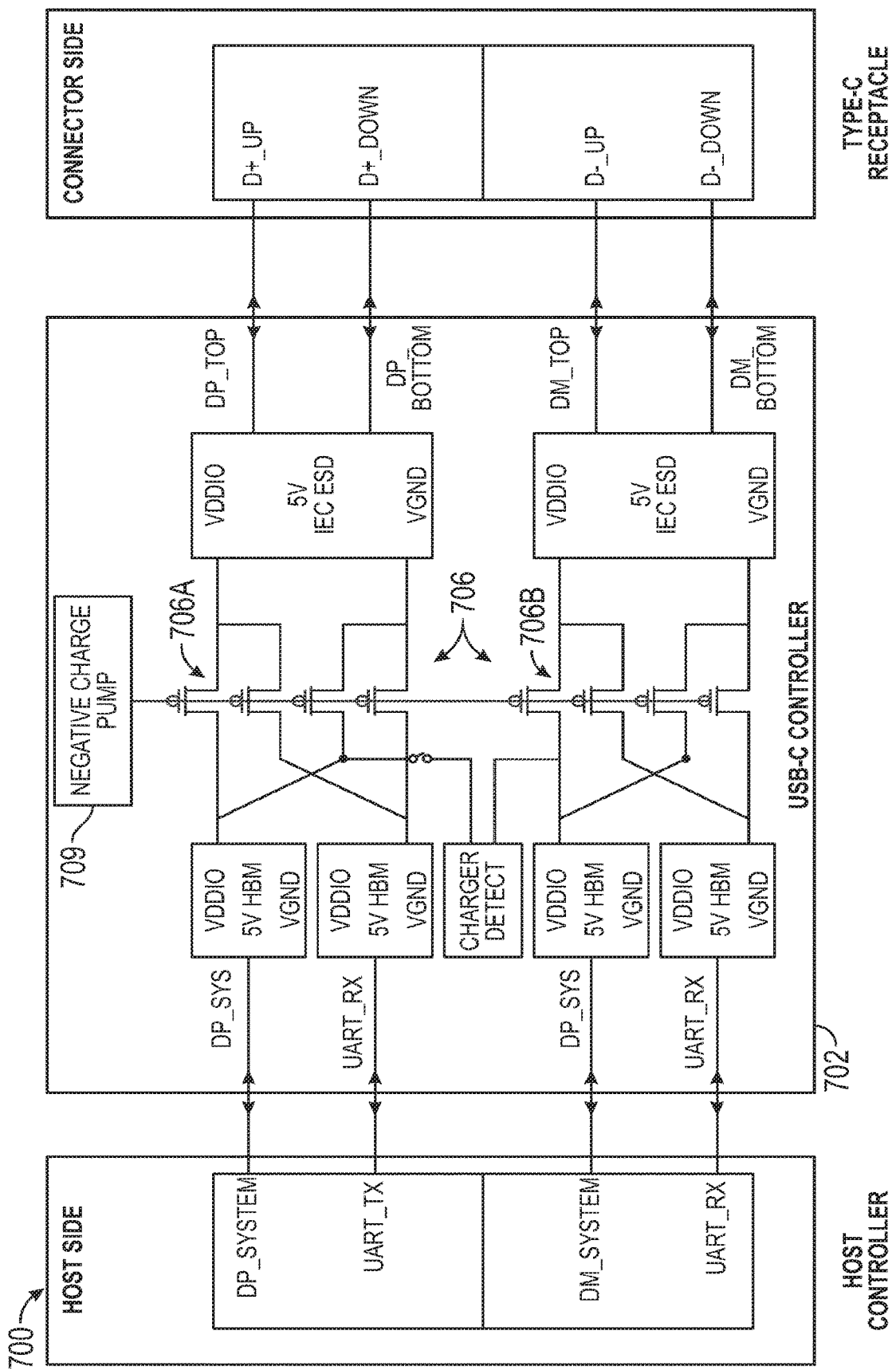
FIG. 7 is a circuit diagram illustrating a system having a USB-C controller according to an alternative according to an embodiment.

FIG. 7 is a circuit diagram illustrating a system 700 having a USB-C controller 702 according to an alternative according to an embodiment. The USB-C controller 702 may be similar to the USB-C controllers 402 and 502, but contain a D+/D− multiplexer 706 made up of p-type MOSFETs, e.g., PFETs. The D+/D− multiplexer 706 may include a first set of four PFETs 706A and a second four PFETs 706B. The USB-C controller 702 may further include a negative charge pump 709 to drive gates of the PFETs of the D+/D− multiplexer 706.

Figure 8:
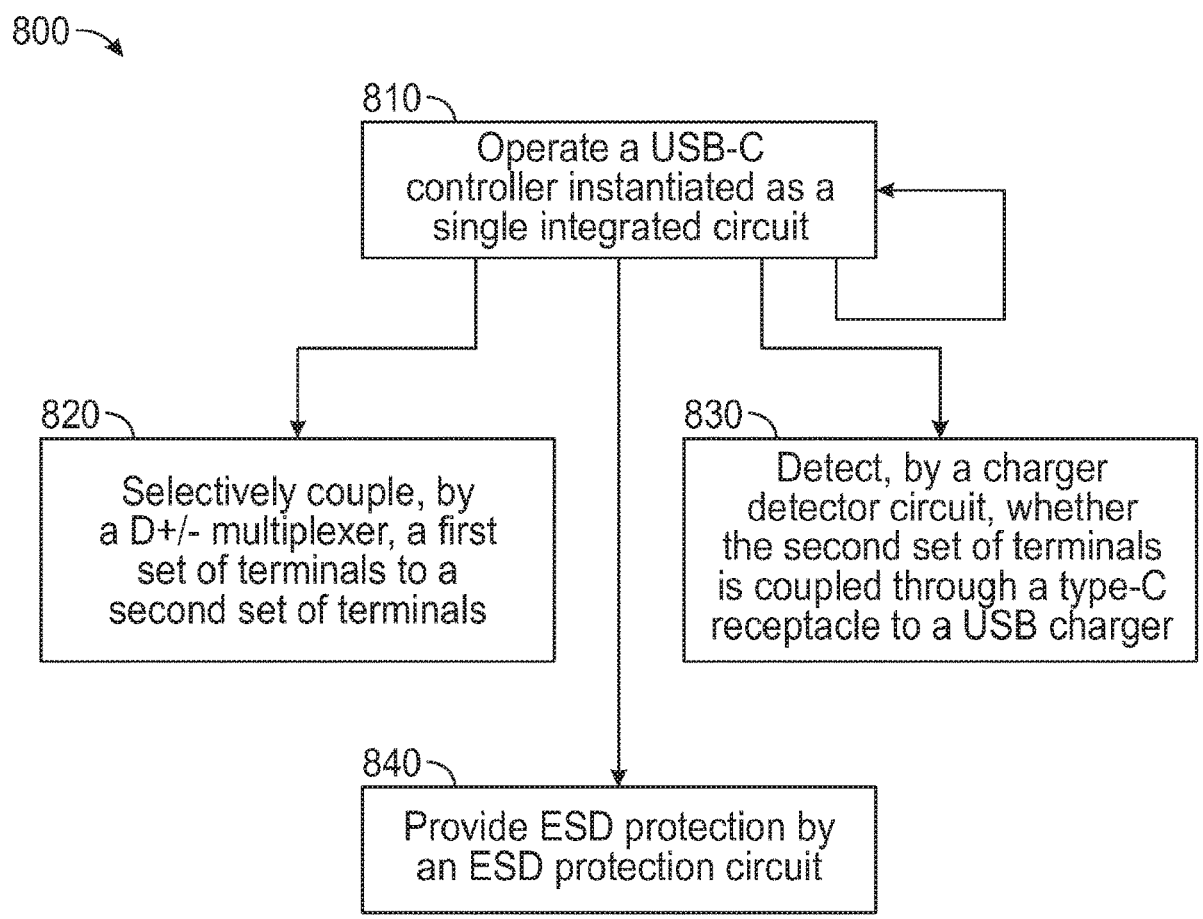
FIG. 8 is a flow chart for a method of designing a USB-C controller to form a high-speed, type-C interface circuit according to one embodiment.

FIG. 8 is a flow chart for a method 800 of designing a USB-C controller to form a high-speed, type-C interface circuit according to one embodiment. The method 800 may be performed by processing logic that comprises hardware (e.g., circuitry, dedicated logic, programmable logic, microcode, etc.). In some embodiments, the method 800 is performed wholly or in part by one of the USB-C controllers discussed herein.

In various embodiments, the method 800 may begin by operating a USB-C controller instantiated as a first integrated circuit, wherein the USB-C controller includes a D+/D− multiplexer, a charger detector circuit, and an electrostatic discharge (ESD) protection circuit (810). The operating the USB-C controller may be performed as illustrated in any of blocks 820, 830, and/or 840. For example, the method 800 may continue with selectively coupling, by the D+/D− multiplexer, a first set of terminals to a second set of terminals, wherein the first set of terminals are coupled to host controllers and the second set of terminals are coupled to sets of D+/D− terminals of a type-C receptacle (820). The coupling by the D+/D− multiplexer may be performed in response to, or after, connection orientation is determined based on CC signal(s) on the CC channel of the USB-C controller.

With additional reference to FIG. 8, the method 800 may continue with detecting, by the charger detector circuit, whether the second set of terminals are coupled to a USB charger through the type-C receptacle, wherein the charger detector circuit is coupled between a positive data system terminal and a negative data system terminal of the first set of terminals (830). The detecting by the charger detector circuit may be performed in response to, or after, determining that a second or peripheral device is connected or attached to the type-C receptacle.

With additional reference to FIG. 8, the method 800 may continue with providing ESD protection by the ESD protection circuit, wherein the ESD protection circuit is coupled between the D+/D− multiplexer and the second set of terminals (840). The ESD protection by the ESD protection circuit may be provided whenever the second or peripheral device is coupled to the second set of terminals through the Type-C receptacle.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. A Universal Serial Bus Type-C (USB-C) controller comprising:
    a set of host terminals to be coupled to a host controller, wherein the set of host terminals comprises a positive data system terminal and a negative data system terminal;
    a first configuration channel (CC) terminal to be coupled to a first CC line of a USB-C receptacle;
    a second CC terminal to be coupled to a second CC line of the USB-C receptacle;
    a set of D+/D− terminals to be coupled to sets of D+/D− lines of the USB-C receptacle;
    a CC interface circuit coupled to the first and second CC terminals, wherein the CC interface circuit is to detect connector orientation of the USB-C receptacle based on signals received from at least one of the first and second CC terminals, and to configure one of the first and second CC terminals as a CC signal terminal and the other one of the first and second CC terminals as a VCONN terminal based on the connector orientation of the USB-C receptacle; and
    a D+/D− interface circuit coupled to the set of D+/D− terminals, wherein the D+/D− interface circuit comprises a multiplexer to selectively couple the positive data system terminal to a D+ terminal of the set of D+/D− terminals and the negative data system terminal to a D− terminal of the set of D+/D− terminals;
    wherein the USB-C controller is instantiated as an integrated circuit (IC) chip.

2. The USB-C controller of claim 1, wherein the CC interface circuit comprises a gate drive circuit and a charge pump that are coupled to a pair of switches, wherein the pair of switches is coupled to the first and second CC terminals.

3. The USB-C controller of claim 2, wherein the CC interface circuit further comprises a reference circuitry coupled to the first and second CC terminals, and wherein the reference circuitry is to detect types of incoming signals received through the first and second CC terminals and to generate outgoing control signals over the first and second CC terminals.

4. The USB-C controller of claim 1, wherein:
the set of host terminals comprises a pair of Universal Asynchronous Receiver-Transmitter (UART) terminals; and
the D+/D− interface circuit comprises a multiplexer to selectively couple the pair of UART terminals to a D+ terminal of the set of D+/D− terminals and a D− terminal of the set of D+/D− terminals.

5. The USB-C controller of claim 1, wherein:
the set of host terminals comprises a pair of auxiliary terminals and a pair of control signal terminals; and
the USB-C controller further comprises:
a pair of side band use (SBU) terminals to be coupled to a pair of SBU lines of the USB-C receptacle; and
a sideband interface circuit coupled to the pair of SBU terminals, wherein the sideband interface circuit is to selectively couple the pair of SBU terminals to the pair of auxiliary terminals and the pair of control terminals.

6. The USB-C controller of claim 5, wherein the sideband interface circuit comprises a four-by-four multiplexer to selectively couple the pair of SBU terminals to the pair of auxiliary terminals and the pair of control terminals.

7. The USB-C controller of claim 5, wherein:
the pair of auxiliary terminals comprises a negative auxiliary terminal (AUX_N) and a positive auxiliary terminal (AUX_P) that are to provide signals for DisplayPort signaling; and
the pair of control signal terminals comprises a transmit control signal terminal (LSTX) and a receive control signal terminal (LSRX) that are to provide thunderbolt link management signals.

8. The USB-C controller of claim 1, further comprising a set of communication terminals to be coupled to an embedded controller, wherein the set of communication terminals are to provide signals for inter-integrated circuit connection (I2C) communication.

9. The USB-C controller of claim 1, further comprising one or more of:
a charger detector circuit coupled to the set of D+/D− terminals to detect whether a USB charger is connected to the USB-C receptacle; and
an electrostatic discharge (ESD) protection circuit coupled between the set of host terminals and the set of D+/D− terminals.

10. A system comprising:
a Universal Serial Bus (USB) host controller;
a USB Type-C (USB-C) receptacle; and
a USB-C controller instantiated as an integrated circuit (IC) chip, wherein the USB-C controller comprises:
a set of host terminals coupled to the USB host controller, wherein the set of host terminals comprises a positive data system terminal and a negative data system terminal;
a first configuration channel (CC) terminal coupled to a first CC line of the USB-C receptacle;
a second CC terminal coupled to a second CC line of the USB-C receptacle;
a set of D+/D− terminals coupled to sets of D+/D− lines of the USB-C receptacle;

a CC interface circuit coupled to the first and second CC terminals, wherein the CC interface circuit is to detect connector orientation of the USB-C receptacle based on signals received from at least one of the first and second CC terminals, and to configure one of the first and second CC terminals as a CC signal terminal and the other one of the first and second CC terminals as a VCONN terminal based on the connector orientation of the USB-C receptacle; and
a D+/D− interface circuit coupled to the set of D+/D− terminals, wherein the D+/D− interface circuit comprises a multiplexer to selectively couple the positive data system terminal to a D+ terminal of the set of D+/D− terminals and the negative data system terminal to a D− terminal of the set of D+/D− terminals.

11. The system of claim 10, further comprising:
a power subsystem;
a provider path circuit coupled between the power subsystem and a VBUS line of the USB-C receptacle, the provider path circuit to provide power to the VBUS line; and
a consumer path circuit coupled between the power subsystem and the VBUS line of the USB-C receptacle, the consumer path circuit to provide power to the power sub system;
wherein the USB-C controller further comprises gate control terminals coupled to the provider path circuit and the consumer path circuit, wherein the USB-C controller is to turn on the provider path circuit or the consumer path circuit based on role detection signals received on the CC signal terminal.

12. The system of claim 10, wherein the CC interface circuit comprises:
a gate drive circuit and a charge pump that are coupled to a pair of switches, wherein the pair of switches is coupled to the first and second CC terminals; and
a reference circuitry coupled to the first and second CC terminals, wherein the reference circuitry is to detect types of incoming signals received through the first and second CC terminals and to generate outgoing control signals over the first and second CC terminals.

13. The system of claim 10, wherein:
the system further comprises a test-and-debug controller;
the USB-C controller further comprises a pair of Universal Asynchronous Receiver-Transmitter (UART) terminals coupled to the test-and-debug controller; and
the D+/D− interface circuit comprises a multiplexer to selectively couple the pair of UART terminals to a D+ terminal of the set of D+/D− terminals and to a D− terminal of the set of D+/D− terminals.

14. The system of claim 10, wherein:
the system further comprises a thunderbolt (TBT) controller; and
the USB-C controller further comprises:
a pair of auxiliary terminals and a pair of control signal terminals coupled to the TBT controller;
a pair of side band use (SBU) terminals coupled to a pair of SBU lines of the USB-C receptacle; and
a sideband interface circuit coupled to the pair of SBU terminals, wherein the sideband interface circuit is to selectively couple the pair of SBU terminals to the pair of auxiliary terminals and the pair of control terminals.

15. The system of claim 14, wherein the sideband interface circuit comprises a four-by-four multiplexer to selectively couple the pair of SBU terminals to the pair of auxiliary terminals and the pair of control terminals.

16. The system of claim 14, wherein:
- the pair of auxiliary terminals comprises a negative auxiliary terminal (AUX_N) and a positive auxiliary terminal (AUX_P) to provide signals for DisplayPort signaling; and
- the pair of control signal terminals comprises a transmit control signal terminal (LSTX) and a receive control signal terminal (LSRX) to provide TBT link management signals.

17. The system of claim 10, wherein:
- the system further comprises an embedded controller; and
- the USB-C controller further comprises a set of communication terminals coupled to the embedded controller, the set of communication terminals to provide signals for inter-integrated circuit connection (I2C) communication.

18. The system of claim 10, wherein the USB-C controller further comprises one or more of:
- a charger detector circuit coupled to the set of D+/D− terminals to detect whether a USB charger is connected to the USB-C receptacle; and
- an electrostatic discharge (ESD) protection circuit coupled between the set of host terminals and the set of D+/D− terminals.

\* \* \* \* \*